United States Patent [19]
Hurst et al.

[11] 3,735,023
[45] May 22, 1973

[54] SENSOR PACKAGE FOR ELECTRICAL SENSING OF PLANE COORDINATES AND METHOD OF PREPARING THE SAME

[75] Inventors: George S. Hurst; William C. Colwell, Jr., both of Oak Ridge, Tenn.

[73] Assignee: University of Kentucky Research Foundation, Lexington, Ky.

[22] Filed: Apr. 19, 1972

[21] Appl. No.: 245,564

[52] U.S. Cl............174/117 FF, 29/592, 174/117 F, 178/18
[51] Int. Cl..............................................H01b 7/08
[58] Field of Search..................174/117 F, 1 FF; 178/18; 29/592; 317/261

[56] References Cited

UNITED STATES PATENTS

| | | | |
|---|---|---|---|
| 3,364,402 | 1/1968 | Davis | 174/117 R |
| 3,662,105 | 5/1972 | Hurst et al. | 178/18 |
| 3,671,675 | 6/1972 | Ress | 174/1 FF |

*Primary Examiner*—E. A. Goldberg
*Attorney*—William E. Sherwood

[57] ABSTRACT

A sensor package for ready insertion in properly registered position upon, or for removal from, a cabinet employed in electrical sensing of plane coordinates, is constructed to provide accurate readings when pierced by a small manually operated cursor.

A method for manufacturing the package including the affixing of accurately spaced electrodes on the package, is disclosed.

10 Claims, 6 Drawing Figures

SENSOR PACKAGE FOR ELECTRICAL SENSING OF PLANE COORDINATES AND METHOD OF PREPARING THE SAME

BACKGROUND OF THE INVENTION

The coordinate measuring system disclosed in Hurst et al. patent application, Ser. No. 39,353 U.S. Pat. No. 3,662,105 is capable of providing highly accurate coordinate values in analogue form for input to X-Y plotters, X-Y work tables and the like, and, with appropriate accessory equipment, may be interfaced to teletypes, computers, tape storage or other digital processors. When employing a sensor package as herein described a measuring accuracy of at least 0.4 mm ( including typical human error) may be obtained. Thus reliable coordinate information may be read from a wide variety of source material among which may be mentioned maps, drawings, strip charts, medical charts, photographs and the like. This accuracy, of course, depends upon having available a sensor package so constructed that when the puncturing probe repeatedly enters and withdraws from the package there will ensue no alteration in the relative positions of the several sheets of the package. Moreover, the electrodes of the package must be so disposed as to insure at all times that equipotential lines will be extending across the respective conductive sheets normal to each other during use of the package. Furthermore, the packages should be manufactured in such a way that when one package is replaced by another no variation of measuring accuracy will occur.

Conforming to these requirements has heretofore presented certain manufacturing problems and it is a purpose of this invention to produce an improved sensor package by a manufacturing process which overcomes those problems.

SUMMARY OF THE INVENTION

The invention employs the combination of a pair of conductive sheets having a uniform resistivity throughout and with these sheets being insulated from each other and juxtaposed so that equipotential lines extending across the respective sheets are orthogonal to each other. Each conductive sheet has a pair of electrodes providing mechanical strength to the fragile sheet and adapted to contact terminals provided in the cabinet upon which the package is to be mounted. The electrodes of the conductive sheet are equally spaced from each other as determined by a corresponding pair of edges of an overlying reference sheet. The method of manufacturing the package includes the step of emplacing a strip electrode material upon the opposite edges of the conductive sheet and then applying a conductive paint to the conductive sheet in the space between the strip electrode and the adjacent edge of the reference sheet.

Among the objects of the invention are the provision of an improved sensor package which can be readily inserted in properly registered position upon, or easily removed from, a cabinet employed in the electrical sensing of plane coordinates; the provision of an improved sensor package reinforced to prevent damage to the fragile portions of the package; the provision of an improved sensor package having sheet portions bonded to each other and substantially impervious to moisture or to alteration of the relative positions of the sheets during normal usage of the package; the provision of a method for manufacturing sensor packages in which accuracy of electrode spacing of the conductive sheets may be secured without tedious manipulation of the electrodes; and an improved method of manufacturing sensor packages in which quality control of the product may be obtained in a relatively inexpensive manner.

These and other objects and advantages of the invention will become more apparent as the description proceeds and when considered in conjunction with the accompanying drawings in which FIG. 1 is a perspective view of one form of equipment embodying the invention and showing the sensor package in position for use.

Figures 1, 2:
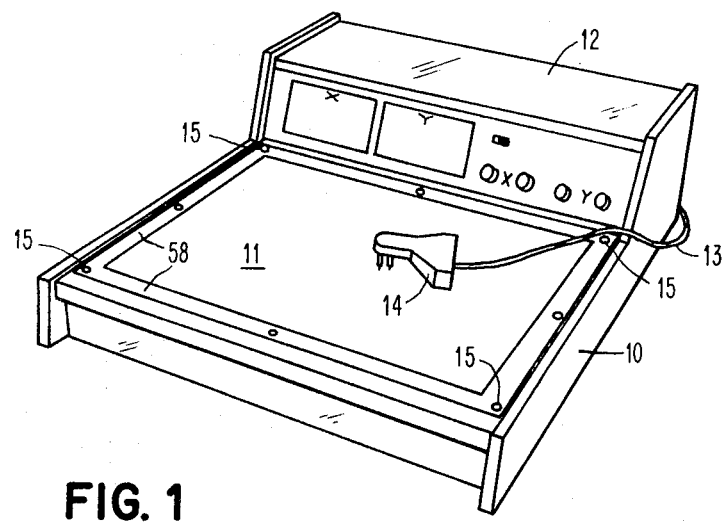
FIG. 2 is a schematic exploded view showing the relative locations of certain sheets of the package and indicating in dotted lines an optional conductive sheet which may be employed.

Referring now to FIG. 1, a cabinet 10 detachably supports on its working surface a sensor package 11 and provides interior space for conductors (not shown) extending from the electrodes of the package to suitable power sources and to data indicating apparatus. Conveniently, these power sources for energizing the package may comprise batteries housed within the cabinet and the indicating apparatus may be housed in readily visible form in an elevated back portion 12 of the cabinet. A conductor 13 located externally of the cabinet leads to an improved manually movable cursor or probe 14 having a puncturing needle as more fully disclosed in a copending application.

Detachable fastening means 15 such as indicated at the corners of the sensor package provide for register of the package and for ready substitution of a new package for a used package.

Figure 6:
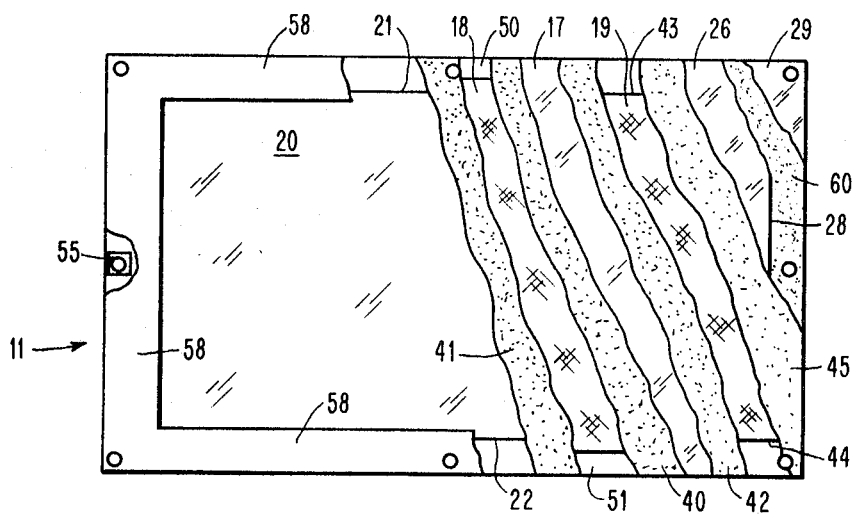
FIG. 6 is a top plan view of the package broken away to show the location of bonding layers.

As shown in FIGS. 2 and 6, the package includes a centrally disposed rectangular sheet 17 of electrical insulating material with first and second sheets 18, 19 respectively of electrical conductive material having a uniform resistivity throughout and disposed in stacked relation on the respective facing surfaces of the insulation sheet. A first reference sheet 20 of electrical non-conductive material is disposed in stacked relation above sheet 18 and significantly has parallel side edges 21, 22 which are separated by a lesser distance than the side edges of sheets 17 and 18. Furthermore, the distance between the end edges 23, 24 of sheet 18 is less than the distance between the end edges of its adjacent sheets 17 and 20.

Disposed beneath conductive sheet 19 in stacked relation to the other sheets is a second reference sheet 26 of electrical non-conducting material and having parallel end edges 27, 28 which are separated by a lesser distance than the end edge of sheets 17, 19 and 20. Preferably, but not necessarily, a base board 29 of electrical non-conductive material is disposed in stacked relation to the above described sheets and its side edges and end edges are separated by a distance equal to the greatest of the corresponding distances of any of the companion sheets. This base board has a thickness substantially greater than the thickness of any of the other sheets of the package. As disclosed in the aforesaid application, Ser. No. 39,353 electrical conductive sheets other than sheets 18, 19 may be employed in connection with the sensor package if desired and without departing from the present invention. For example, a thin aluminum sheet 30 having a conductor 31 leading therefrom may be interposed between the base board and the adjacent reference sheet 26.

The manufacture of a package including the components as above described forms a significant feature of the present invention and may be conducted as follows. Having available the insulating sheet 17 in flat form, a thin layer 40 (approximately 0.004 inch thick) of dry mounting tissue for example, that available from Eastman Kodak Co. or of MT5 mounting tissue available from Seal, Inc. of Derby, Connecticut, is placed upon one face of sheet 17. The first conducting sheet 18 is then carefully placed on the tissue layer with the side edges of sheet 18 coinciding with the side edges of sheet 17 and with the end edges of sheet 18 being spaced equally from the end edges of sheet 17. Thereafter, the first reference sheet 21, which preferably is made of hard surface Bristolboard or the like with sharply defined edges, is arranged above the sheet 18 with another layer 41 of tissue therebetween and with the side edges 21, 22 equally spaced inboard of the side edges of sheet 18 to provide generous electrode-receiving spaces for example, about 0.50 inch in width.

In a preferred procedure the thus described assembly is then placed in a conventional press and held for approximately one minute at about 250° F. thereby to bond the parts together. Thereafter the article is removed from the press, inverted and a similar layer 42 of tissue is applied to the other face of insulating sheet 17. The second conductive sheet 19 is then carefully placed on layer 42 with the side edges 43, 44 thereof being spaced equally from the side edges of sheet 17 and with its end edges coinciding with the end edges of sheets 17 and 19. The second reference sheet 26 is then carefully arranged on the second conductive sheet 19 with an intermediate layer of tissue 45 therebetween and with its parallel end edges 27, 28 being normal to the side edges 21, 22 of the first reference sheet.

This relationship is significant in obtaining the required equipotential lines on the sheet faces between the electrodes of the respective conductive sheets, as will later appear. In so arranging the second reference sheet, moreover, the end edges 27, 28 thereof are equally spaced inboard of the end edges of sheets 17 and 19 to provide generous electrode-receiving spaces. With the assembly thus arranged, it is then placed again in the press, held for approximately 1 minute at 250°F., and removed from the press in readiness for electrode attachment. As an alternative, the package may be bonded in one operation rather than in two steps.

Figure 3:
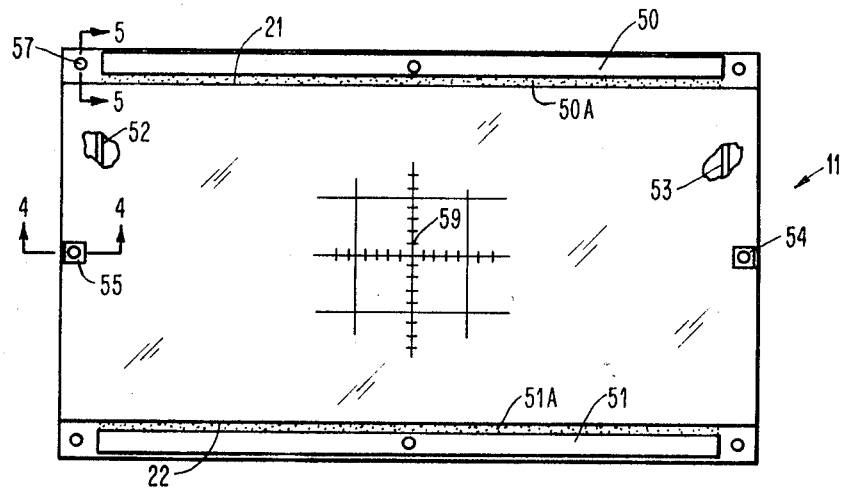
FIG. 3 is a partially broken away plan view of the surface of the package prior to affixing the masking tape.

Since the conductive sheets 18, 19, which are to be pierced by the stylus, are quite thin and fragile and since attachment and detachment of conductors leading from these sheets might otherwise damage the sensor package, the invention provides an improved method of attaching electrodes to these sheets. Following the bonding of the sheets as described, a pair of strip electrodes 50, 51, which for example may comprise the No. 421 lead-foil-tape about 0.375 inch wide and 0.006 inch thick available from 3-M Company, is affixed to the exposed side edge spaces of sheet 18 outboard of the side edges 21, 22 of the first reference sheet, care being taken to insure that lengths of these electrodes are such as to leave spaces at the four corners of the sensor package (as viewed in FIG. 3) and through which the fastening means 15 may be passed without electrical contact. After affixing the electrode strips, which add mechanical strength, the electrodes are then painted with a conductive paint such, for example, as Electrolag 415 available from Acheson Colloid Co., Port Huron, Michigan, care being taken that this paint fills any space between the electrodes and the adjacent edges 21, 22 of the first reference sheet, as indicated at 50A and 51A. Accordingly, when a voltage is later applied across the electrodes 50, 51 equipotential lines will be formed across the sheet 18 as described in said application, Ser. No. 39,353 U.S. Pat. No. 3,662,105. Moreover, by assembling the electrodes in this manner a comparatively simple and labor-saving technique may be employed.

With electrodes 50, 51 so emplaced, the assembly is inverted and electrodes 52,53 are emplaced in like manner on the second conductive sheet 19. Accordingly when a voltage is later applied across electrodes 52, 53 a similar series of equipotential lines will be formed across the sheet 19 and with such lines being normal to the lines of companion conductive sheet 18.

Assuming that reference sheet 20 is to provide the working surface for the sensor and that the terminals for conductors leading from the several electrodes are located on a common face of the package, a pair of tabs 54, 55 formed of the foil tape are attached to a central portion of electrodes 52, 53 and are adapted to be bent over the end edges of the reference sheet 20.

Figure 4:
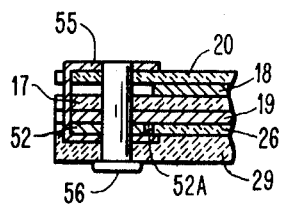
FIG. 4 is a sectional view to a larger scale taken on line 4—4 of FIG. 3.
Figure 5:
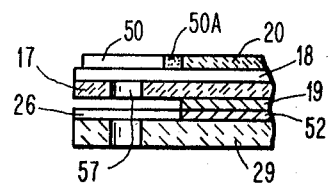
FIG. 5 is a sectional view to a larger scale taken on line 5—5 of FIG. 3.

Having thus assembled the described portions of the package, a layer 60 of tissue is then interposed between the reference sheet 26 and the base board 29 and is suitably bonded thereto. Holes are then bored through the entire assembly at approximately the mid-lengths of the several electrodes and suitable metallic grommets 56 as illustrated in FIG. 4 are inserted in these holes from the underside and are clinched in place on the upperside. In the case of the electrodes 52,53 these grommets are in electrical contact with the tabs 54, 55 both below the reference sheet 26 and above the reference sheet 20.

Holes 57 also are preferably bored through the insulating sheet 17 at the four corners thereof and are adapted to receive fastening means 15 for registering the package in cabinet 10. As will be understood, suitable terminals (not shown) with conductors attached thereto will be mounted on the cabinet interior for register with the four grommets. Also as a finishing step of manufacture, a masking tape 58 covering exposed electrodes, and formed of an electrical non-conducting material is disposed around the boundary of the package as best shown in FIG. 1. As will further be understood, the reference sheets preferably contain surface markings 59 of plane coordinates, or the like, and which are not obscured by the masking tape.

Having thus described and illustrated the preferred embodiments of the invention, it will be appreciated that the invention may, of course, also be embodied in other forms within the scope of the appended claims.

What is claimed is:

1. The method of preparing a sensor package including, providing a rectangular sheet of electrical insulating material, arranging first and second sheets of electrical conductive material in stacked relation to the respective faces of said insulating sheet with the end edges of said first conductive sheet being offset inwardly from the end edges of said insulating sheet and with the side edges of said second conducting sheet being offset inwardly from the side edges of said insulating sheet, arranging first and second rectangular reference sheets of electrical non-conducting material in stacked relation to the respective faces of said conducting sheets with the parallel side edges of said first reference sheet being offset inwardly from the side edges of said first conducting sheet to provide electrode-receiving spaces on said first reference sheet for a first pair of electrodes and with the parallel end edges of said second reference sheet being offset inwardly from the end edges of said second conducting sheet to provide electrode-receiving spaces on said second reference sheet for a second pair of electrode means, effecting a bonding of the several juxtaposed sheets to each other in order to establish a fixed position of the several sheets in the form of an intermediate assembly having the end edges of said second reference sheet normal to the side edges of said first reference sheet, affixing said electrode means to the intermediate assembly in the respective exposed spaces of the first and second conducting sheets, completing the affixing of said electrode means by filling in any space between said electrode means and the adjacent edges of the corresponding reference sheet with a conducting coating material, and thereafter affixing a protective non-conducting masking strip to the boundary of at least one of said reference sheets in superposed relation to the corresponding completed electrode means.

2. The method of claim 1 including effecting said bonding operation in a first step comprising bonding one of said reference sheets and one of said conducting sheets to said insulating sheet and in a second step comprising bonding the other of said reference sheets and the other of said conducting sheets to the previously bonded sheets.

3. The method of claim 1 including interposing a layer of dry mounting tissue between adjacent sheets of material prior to effecting said bonding operation.

4. The method of claim 3 including affixing a rigid backing sheet of electrical non-conducting material to one of said reference sheets following the affixing of said electrode means.

5. The method of claim 4 including the step of boring apertures extending through each of said four electrode means and thereafter inserting a metallic grommet in each of said apertures thereby to provide for convenient placing of said package in a supporting structure and for convenient attachment of electrical connections to said electrode means.

6. A package for use in the electrical sensing of plane coordinates including, a rectangular sheet of electrical insulating material, first and second sheets of electrical conducting material in stacked relation to the respective adjacent faces of said insulating sheet, first and second reference sheets of electrical non-conducting material in stacked relation to the respective adjacent faces of said conducting sheets, said first reference sheet having parallel side edges and being of less width than said first conducting sheet and said second reference sheet having parallel end edges and being of less length than said second conducting sheet, a first pair of electrodes attached to said first conducting sheet adjacent the side edges thereof and including a coating of electrical conducting material extending to the adjacent parallel side edges of said first reference sheet, a second pair of electrodes attached to said second conducting sheet adjacent the end edges thereof and including a coating of electrical conducting material extending to the parallel end edges of said second reference sheet, said second and said first pairs of electrodes being out of contact with each other and said side edges of said first reference sheet being normal to said end edges of said second reference sheet, a masking strip of electrical non-conducting material at the boundary of at least one of said reference sheets covering the electrodes of the adjacent conducting sheet, and means bonding adjacent sheets to each other thereby to provide a fixed relation between the respective sheets.

7. A package as defined in claim 6 wherein said bonding means comprises thin sheets of dry mounting tissue.

8. A package as defined in claim 6 wherein said electrodes comprise strips of electrical conductive foil material.

9. A package as defined in claim 6 wherein said coating comprises electrical conductive paint.

10. A package as defined in claim 6 including a rigid base board of electrical non-conducting material bonded to one of said reference sheets and having a thickness greater than the thickness of any of the other sheets of said package.

* * * * *